United States Patent
Cacace et al.

[11] Patent Number: 5,676,775
[45] Date of Patent: Oct. 14, 1997

[54] PROCESS FOR MANUFACTURING CORROSION RESISTANT METAL PRODUCTS

[76] Inventors: Antonino Giorgio Cacace, Crud Y Gwunt, Caswell, Swansea, West Glamorgan SA3 3BU; Allan Douglas Clark, 11 Heol Morlais, Llanon, Nr. Llanelli, Dyfed SA14 6BD, both of United Kingdom

[21] Appl. No.: 481,421
[22] PCT Filed: Jan. 17, 1995
[86] PCT No.: PCT/GB94/00091
  § 371 Date: Aug. 14, 1995
  § 102(e) Date: Aug. 14, 1995
[87] PCT Pub. No.: WO94/16111
  PCT Pub. Date: Jul. 21, 1994

[30] Foreign Application Priority Data
  Jan. 18, 1993 [GB] United Kingdom ............... 9300835
[51] Int. Cl.⁶ .................... B22F 7/02; B32B 15/16
[52] U.S. Cl. .................... 148/632; 148/513; 29/403.2; 428/685; 428/548
[58] Field of Search .................... 148/632, 513; 29/403.2; 428/685, 548

[56] References Cited

U.S. PATENT DOCUMENTS 3,774,289  11/1973  Cacace et al. ............... 29/403

FOREIGN PATENT DOCUMENTS 61-201706  9/1986  Japan.
61-243149  10/1986  Japan.

*Primary Examiner*—Deborah Yee
*Attorney, Agent, or Firm*—Young & Thompson

[57] ABSTRACT

A method is disclosed of producing a corrosion resistant product from a billet comprising a core of finely divided ferrous swarf compacted into briquettes in a stainless steel jacket and in which the billet is heated to a temperature at which it becomes sufficiently plastic to be worked into a finished or semi-finished product by an operation such as rolling. An additive is pre-mixed with the swarf which, when the billet is heated, reacts to form an atmosphere inside the jecket which displaces or prevents the formation of carbon dioxide and/or other gases which at elevated temperatures would oxidise the stainless steel to form chrome oxides at the interface between the jacket and the core. The additive is preferably in powder form. Examples of suitable additives include urea and ammonium chloride.

14 Claims, 1 Drawing Sheet

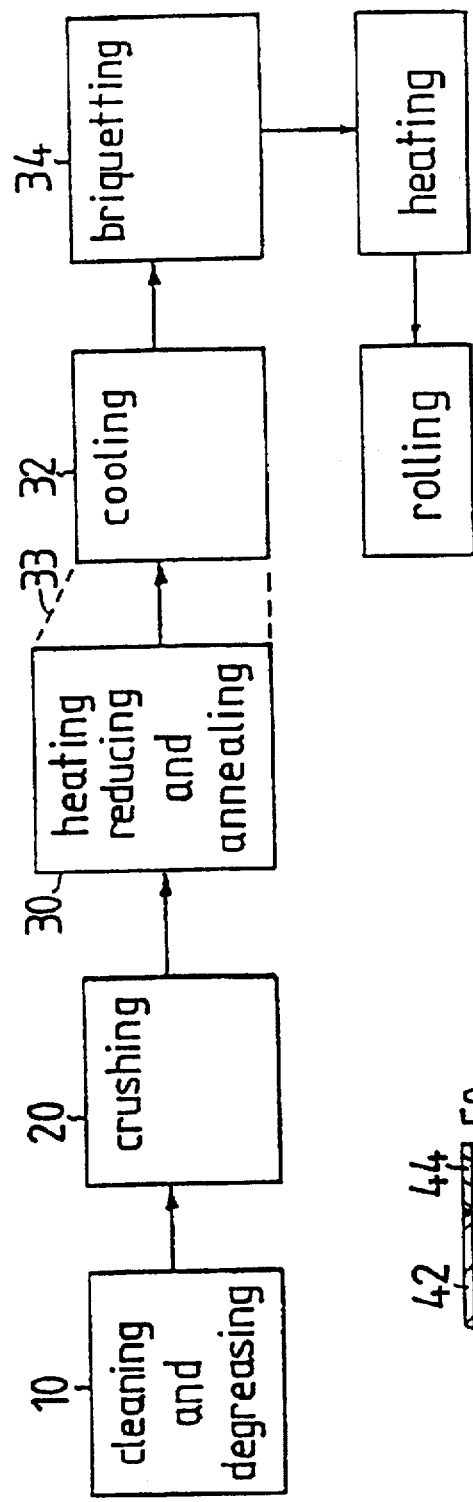
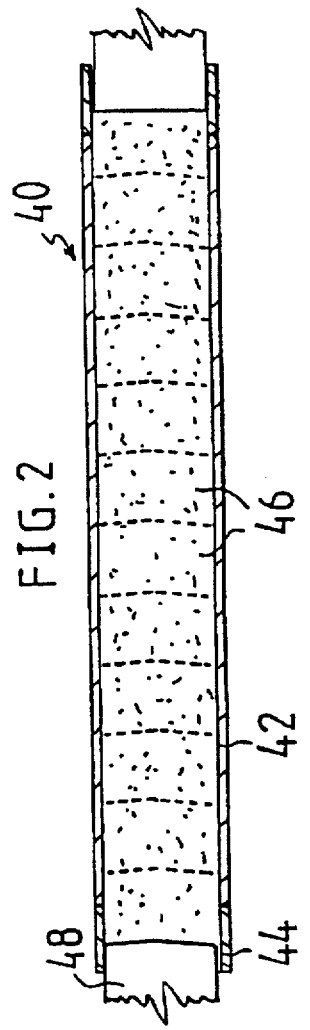
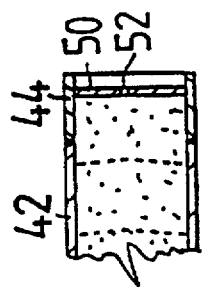
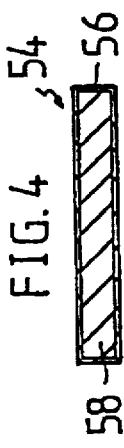

5,676,775

PROCESS FOR MANUFACTURING CORROSION RESISTANT METAL PRODUCTS

FIELD OF THE INVENTION

This invention relates to a process for the manufacture of corrosion resistant metal products and to products produced from the process. The invention has particular but not necessarily exclusive application to products comprising a core formed from recycled mild, carbon or stainless steel swarf and having a stainless steel cladding. For example, the invention may also be applicable to a product comprising a core formed from powdered iron ore and even from other metals and metalliferous ores in which the problems identified herein are encountered.

In this specification 'swarf' comprehends the off cuts from machining operations in general and is intended to include the off cuts from mining, boring, shaping and milling operations on engineering steels. The off cuts from some stamping and punching operations may also be suitable. The term "engineering steel" is intended to describe those low alloy steels which am commonly subjected to machining operations including mild steel (a term which itself includes carbon steel), forging steel and axle or shaft steel all of which contain significant amounts of carbon.

BACKGROUND OF THE INVENTION

A number of proposals have been made to rework scrap steel swarf into a useful product without remelt. Of these the only process known to the applicant which has been commercially worked is that disclosed in British patent #1313545. The commercial working of this process was carried out by the present applicants' predecessors in title. In this process steel swarf which has been cleaned and chipped is compacted and enclosed in a steel jacket to form a billet. The billet is heated to about 1200° C. prior to being rolled in a substantially conventional rolling mill. The heating causes surface oxides on the swarf to be reduced by a reducing agent derived from carbon which is either premixed with the swarf or, more commonly as has turned out in practice, is evolved from decarburisation of the swarf. The onset of the reduction process is evinced by the presence of a blue flame at an orifice provided in the jacket to allow gases evolved inside the jacket to escape. When reduction is complete the blue flame disappears. In the rolling operation the chips weld together to form a substantially homogeneous mass.

The process is practically successful owing at least partially to the presence of the jacket which prevents atmospheric oxygen from getting to the swarf when it is hot. There have been other prior proposals in which a jacket is not used. In practice, no way has been found to prevent oxidation of a hot unjacketed billet while it is being worked.

One of the products of the process described in the aforementioned British patent #1313545 which is potentially of commercial and technical importance is a billet comprised of a stainless steel jacket filled with briquettes of mild steel swarf which can be worked into a finished product having the desirable properties and low cost of mild steel but which has a stainless steel cladding for substantially increased corrosion resistance. Attempts to produce such products have not been as successful as was originally hoped and it is an object of the present invention to address one of the problems which has contributed to this lack of success.

In the numerous experiments which have been conducted in attempts to produce such products, they have persistently exhibited a green oxide layer occurring on the inner face of the stainless steel cladding and at the interface between the cladding and the core. This green layer has occurred despite the fact that metallographic examination of the core indicates substantially complete reduction of all surface oxides in the swarf and substantially complete fusion between the particles of swarf. Bonding between the cladding and the core cannot be relied on where this green layer occurs.

It is clear that the green layer is an indication of the formation of chrome oxides derived from the chromium in the stainless steel. It was originally thought that the chrome oxides were forming as a result of the presence of residual atmospheric oxygen in the billet. Early experimental work therefore concentrated on ensuring that such residual oxygen was eliminated. It was thought that this could be achieved by the addition of carbon to the swarf prior to compaction in the jacket and/or by evacuating the jacket prior to heating. It was supposed that the surface oxides on the swarf could not be responsible for oxidation of the chromium since the surface oxides are reduced (to CO and/or $CO_2$) by the added carbon or by carbon which diffuses out of the swarf. However, even when the greatest care is taken to eliminate the residual oxygen, it has been found that the aforementioned green layer persists. It was therefore concluded that the $CO_2$ and possibly CO is oxidising to the chrome at the elevated temperatures encountered in the tube. This was a somewhat surprising conclusion which was not uniformly supported by informed opinion.

Inside the tube the reducing reaction on the swarf particles can be described as follows:

Above 570° C.

$$Fe_3O_4 + CO = 3FeO + CO \quad (1)$$

$$FeO + CO = Fe + CO_2 \quad (2)$$

$$CO_2 + C = 2CO \quad (3)$$

Once the surface oxides on the mild steel are reduced the $CO_2$ itself is reduced to CO and in stage (3) the reaction goes almost to completion when the $CO_2$ is exhausted. It is clear therefore that both $CO_2$ and CO are present in the system during a significant proportion of the time that it takes to reduce the iron oxides on the surface of the swarf. During stages (1) and (2) of the reaction, gas proportions have been found to be:

$$CO = 26\% \quad CO_2 = 14\% \quad N_2 = 60\%$$

At temperatures over 700° C. this gas mixture is highly reducing to mild steel but, between 900° and 1200° C., $CO_2$ has been found to be oxidising to austenitic stainless steel leading to the formation of chrome oxides as mentioned above. It is yet not certain whether, in this temperature range, CO is also oxidising to stainless steel. At the present time it appears that it is probably neutral and thus not able to reduce chrome oxides once they are formed.

SUMMARY OF THE INVENTION

According to the invention there is provided a method of producing a corrosion resistant ferrous product in which a billet which comprises a core of particulate ferrous material in a stainless steel jacket is heated to a temperature at which it can be plastically worked, characterised in that an additive is provided in the billet which, when the billet is heated, causes an atmosphere to be formed inside the jacket at a temperature below that at which a significant degree of oxidation of the stainless steel can occur, which atmosphere substantially displaces or prevents the formation of carbon dioxide and/or other gases which are oxidising to the stainless steel when the temperature of the billet is increased to the temperature at which it is plastically worked.

In a particular aspect of the invention, the particulate ferrous material is particulate swarf composed substantially of engineering steel.

In one form of the invention the additive is in non-gaseous, and preferably solid, form when it is inserted in the jacket and, when heated, changes state to form a gas.

According to one aspect of the invention said additive in solid form is inserted in the jacket at ambient temperature and which additive, when the billet is heated, changes state at a temperature below 570° Celsius to form a gas or a mixture of gases.

One preferred additive comprises powdered urea. An alternative preferred additive comprises powdered ammonium chloride. Advantages of an additive in powder form include the fact that it is easier to handle the additive prior to mixing it with the swarf or inserting it in the billet and to control the amount of additive used.

The scope of the invention extends to a product produced by the methods claimed herein.

BRIEF DESCRIPTION OF THE DRAWINGS

An embodiment of the invention is described with reference to the accompanying drawings in which FIG. 1 is a block diagram showing in schematic form successive stages in a process for producing finished products using scrap steel swarf;

FIG. 2 is a schematic cross sectional view of a billet comprising a core of mild steel jacketed in a stainless steel tube;

FIG. 3 is a schematic sectional detail of one end of the billet; and

FIG. 4 is a schematic sectional detail of a flat bar rolled from the billet.

DETAILED DESCRIPTION OF EMBODIMENTS OF THE INVENTION

To prepare the billet shown in FIG. 2, swarf in the form of mild steel shavings is first passed through a cleaning and degreasing apparatus 10 of known kind in which oil, water and other impurities are removed from the shavings. The shavings are then taken to a crusher 20 (again of known kind) where they are crushed into chips of a nominal size of about 2 mm. It is advantageous to reduce the size of the chips to a minimum in order to increase the surface area to weight ratio thereof so that reduction of surface oxides by decarburisation at a later stage in the process can take place as rapidly as possible. However the chip size is not critical and could equally be, say, 5 or 10 mm.

The shavings may alternatively be composed of other suitable grades of engineering steel.

After crushing, the chips are passed through a heating apparatus 30 where they are heated in a reducing atmosphere to a temperature of between 950° and 1200° Celsius. The apparatus 30 may be a rotary kiln into which, as will be well understood, the chips are fed continuously at one end. The chips progress through the kiln by gravity. Alternatively, the apparatus 30 may be a conventional hearth-type furnace. In this latter case the chips may first be placed in reusable containers of heat resistant steel or other suitable material which after being filled with chips are sealed from the atmosphere apart from having small vents to enable gas evolved therein to escape. In either case it is an easy matter to monitor conditions in the heating apparatus to ensure that reduction of the surface oxides on the chips is complete.

After reduction of the surface oxides, the chips are allowed to cool slowly in a cooling furnace 32 in which an inert or reducing atmosphere (e.g. of methane) is maintained so that there is no chance of re-oxidation of the chips occurring.

Where the heating apparatus 30 is a rotary kiln the cooling furnace 32 may also be a rotary kiln. The chips may, after exiting from the rotary kiln, be conveyed to the cooling kiln 32 by a screw conveyor 33 mounted in a closed housing to exclude the air.

Where the heating apparatus 30 is a conventional reheating furnace the cooling kiln may also be a conventional hearth-type furnace. In this case the chips are left in their containers while being moved to the cooling furnace and while being allowed to cool in the cooling furnace. It may be advantageous or even necessary to ensure that the vents in the containers are sealed when they are removed from the reheating furnace to prevent ingress of atmospheric oxygen.

In both cases the chips are removed from the cooling kiln only after they have cooled to ambient temperature.

The above described method of and apparatus for producing chips from swarf are discussed in greater detail in the applicants' international patent application #PCT/GB90/01113.

As soon as possible after being allowed to cool the chips without being reheated are compacted in a briquetting press 34 to form a jacketed billet. A billet 40 is shown in FIG. 2. The billet 40 comprises an outer jacket made up of a centre portion 42 in the form of a tube of grade ASTM A316L or any other suitable grade of stainless steel. A short length of mild steel tube 44 is welded to each end of the centre portion as disclosed more fully in the applicants' international patent application #PCT/GB90/01437. In the case of the billet 40 the chips are compressed to form briquettes 46 by a single ram 48.

A modified pressing apparatus is disclosed in the specification of the applicants' international patent application #PCT/GB90/01438.

In any case, prior to the briquetting operation a predetermined quantity of powdered urea is mixed with a given quantity of the chips while they are still at ambient temperature. Successive charges of this mixture of chips and urea are inserted in the jacket and compressed by the press to form a series of briquettes. The briquettes substantially fill the jacket leaving a small gap at each end which is closed by a plate 50 welded in place. A small hole 52 is drilled in at least one of the plates.

The ends of the billet are now closed and shaped as described more fully in the applicants' international patent application #PCT/01440. The billet is then heated in a reducing furnace to about 1200° C. preparatory to being rolled in a rolling mill in substantially the same manner as described in British patent #1313545. At about 108° C. the urea dissociates, probably forming $NH_3$ and CO. What reaction takes place thereafter is not clear. However the reaction products am apparently non-oxidising to the stainless steel jacket since numerous billets formed by the process described above and examined after being allowed to cool have consistently been substantially free of the aforementioned green oxide layers occurring on the inner face of the stainless steel jacket and at the interface between the jacket and the core.

It is believed that the dissociation of the urea produces a gaseous atmosphere which is sufficiently strongly reducing to reduce chrome oxides which may have formed on the inner face of the stainless steel as a result of oxidation of the chrome therein, or to inhibit the formation thereof in the first place. Such chrome oxides are potentially deleterious to subsequent bonding between the stainless steel jacket and the mild or carbon steel core.

Moreover, products (such as flat bars) rolled from such billets exhibit substantially complete bonding between the mild steel core and the stainless steel cladding. A typical flat bar rolled from a billet is shown at 54 in FIG. 4. The flat bar comprises a core 58 of mild steel which is cladded with a stainless steel cladding 56 of substantial thickness. Substantially complete fusion takes place between the particles of mild steel making up the core and substantially complete bonding takes place between the core and the stainless steel cladding.

After the product is rolled the end portions cladded by the remnant end pieces 44 are cut off and discarded. The end pieces reduce the wastage of stainless steel and also facilitate the entry of the billet into the rolls.

The amount of urea which needs to be added depends on the quantities of materials making up the billet. Billets made with swarf prepared as described above can have as little as 10% air space after compaction. A typical billet may be 1 meter long and 100 mm diameter before rolling. 1 gram mole (i.e. about 60 grams) of urea will give about 22.4 liters of gas at N.T.P which will be sufficient to expel substantially all residual gases in the billet, and/or to form a strongly reducing atmosphere therein which is believed to be substantially free of $CO_2$.

In an alternative example of the invention the same steps are carried out to form a billet as described above except that 1 gram mole (i.e. about 53.3 grams) of ammonium chloride, $NH_4Cl$, is added to the swarf instead of urea. When the billet is heated, the ammonium chloride sublimates at about 520° C. and immediately dissociates into HCl, $H_2$ and $NH_3$. Residual oxygen is thus expelled from the billet. The temperature at which the $NH_4Cl$ sublimates is low enough so that significant amounts of chrome oxides have not yet formed. The gases formed by the sublimation of the $NH_4Cl$ are non-oxidising to the chromium in the stainless steel and moreover strongly inhibit the formation of both $CO_2$ and CO which might otherwise be formed by the surface oxides on the swarf. The exact nature of the reaction is again not entirely clear.

A little zinc may be added with the $NH_4Cl$ to ensure that the billet is pressurised by non-oxidising gas right up to rolling temperature.

In addition to adding the urea or $NH_4Cl$, it may in some circumstances be advantageous to evacuate the billet before heating is commenced.

Various other additives may in some circumstances be used as alternatives to urea or ammonium chloride. These include borax, lithium hydride and hydrazine although the latter is dangerous to health. Suitable additives which are in gaseous or liquid state at ambient temperature may, if necessary, also be used.

To further ensure that no chromium oxides are formed, the inner surface of the stainless steel tube may be metal sprayed with nickel or a nickel alloy.

It is not intended that the scope of a patent granted in pursuance of the application of which this specification forms a part should exclude modifications and/or improvements to the embodiments described and/or illustrated which are within the scope of the invention as defined in the claims or be limited by details of such embodiments further than is necessary to distinguish the invention from the prior art.

We claim:

1. A method of producing a corrosion resistant ferrous product, comprising heating a billet which comprises a core of particulate ferrous material in a stainless steel jacket to a temperature at which it can be plastically worked, providing in the billet an additive selected from the group consisting of urea and ammonium chloride which, when the billet is heated, causes an atmosphere to be formed inside the jacket at a temperature below that at which a significant degree of oxidation of the stainless steel can occur, which atmosphere substantially displaces or prevents the formation of carbon dioxide and/or other gases which are oxidizing to the stainless steel when the temperature of the billet is increased to the temperature at which it is plastically worked, increasing the temperature of the billet to the last-named temperature, and plastically working the billet.

2. A method of producing a corrosion resistant ferrous product, comprising heating a billet which comprises a core of particulate swarf composed substantially of engineering steel in a stainless steel jacket to a temperature at which it can be plastically worked, inserting an additive selected from the group consisting of urea and ammonium chloride in the jacket which, when the billet is heated, causes an atmosphere to be formed inside the jacket at a temperature below that at which a significant degree of oxidation of the stainless steel can occur, which atmosphere substantially displaces or prevents the formation of carbon dioxide and/or other gases which are oxidizing to the stainless steel when the temperature of the billet is increased to the temperature at which it is plastically worked, increasing the temperature of the billet to the last-named temperature, and plastically working the billet.

3. A method according to claim 1, wherein the additive is in non-gaseous form when it is inserted in the jacket and, when heated, changes state to form a gas.

4. A method according to claim 3, wherein the additive is in solid form when it is inserted in the jacket.

5. A method according to claim 4, wherein said additive in solid form is inserted in the jacket at ambient temperature and which additive, when the billet is heated, changes state at a temperature below 570° Celsius to form a gas or a mixture of gases which substantially displaces or prevents the formation of carbon dioxide and/or other gases which are oxidising to the stainless steel when the temperature of the billet is increased to the temperature at which it is plastically worked.

6. A corrosion resistant product produced by a method as claimed in claim 1.

7. A method according to claim 2, wherein the additive is in non-gaseous form when it is inserted in the jacket and, when heated, changes state to form a gas.

8. A method according to claim 7, wherein the additive is in solid form when it is inserted in the jacket.

9. A method according to claim 8, wherein said additive in solid form is inserted in the jacket at ambient temperature and which additive, when the billet is heated, changes state at a temperature below 570° Celsius to form a gas or a mixture of gases which substantially displaces or prevents the formation of carbon dioxide and/or other gases which are oxidizing to the stainless steel when the temperature of the billet is increased to the temperature at which it is plastically worked.

10. A corrosion resistant product produced by a method as claimed in claim 2.

11. A method of producing a corrosion resistant ferrous product from a billet which comprises a core of particulate ferrous material in a stainless steel jacket, the method comprising inserting in the jacket an additive selected from the group consisting of urea and ammonium chloride in solid form when inserted in the jacket and which changes states when heated to form a gas which substantially displaces or prevents the formation of carbon dioxide and/or other gases which are oxidizing to the stainless steel when the temperature of the billet is increased to the temperature at which it is plastically worked, increasing the temperature of the billet to the last-named temperature, and plastically working the billet.

12. A corrosion resistant product produced by a method as claimed in claim 11.

13. A method of producing a corrosion resistant ferrous product from a billet which comprises a core of particulate swarf composed substantially of engineering steel in a stainless steel jacket, the method comprising inserting in the jacket an additive selected from the group consisting of urea and ammonium chloride in solid form when inserted in the jacket and which changes state when heated to form a gas which substantially displaces or prevents the formation of carbon dioxide and/or other gases which are oxidizing to the stainless steel when the temperature of the billet is increased to the temperature at which it is plastically worked, increasing the temperature of the billet to the last-named temperature, and plastically working the billet.

14. A corrosion resistant product produced by a method as claimed in claim 13.

* * * * *